Jan. 25, 1927. 1,615,219

J. C. FRANFIELD

TELEPHONE SWITCHBOARD CORD TERMINAL TEST CONNECTER

Filed March 25, 1925

INVENTOR
J. C. Franfield
BY
ATTORNEY

Patented Jan. 25, 1927.

1,615,219

UNITED STATES PATENT OFFICE.

JOHN C. FRANFIELD, OF HARTFORD, CONNECTICUT, ASSIGNOR TO AMERICAN TELEPHONE AND TELEGRAPH COMPANY, A CORPORATION OF NEW YORK.

TELEPHONE SWITCHBOARD CORD TERMINAL TEST CONNECTER.

Application filed March 25, 1925. Serial No. 18,299.

This invention relates to test connecters, and more particularly to test connecters for telephone switchboard cord terminals.

In telephone switchboards, the tip, ring and sleeve conductors of operators' cords are connected to terminals positioned at the rear of the boards, and from these terminals conductors extend through windings of relays included in the cord circuits. The terminals are of small dimensions and are mounted in closely arranged order upon shelves. To determine the operative condition of the relays associated with the cord circuits, testing apparatus is connected to their respective terminals, after which such adjustment is made of the relays as is indicated by the testing apparatus to be necessary. Many ways have been devised for performing these testing operations, for instance, an extra jack has been provided at the rear of each section of the switchboard, and each of the cords in that section was wired to connect therewith so that by associating a plug of a testing apparatus with said jack, and performing certain time consuming operations, the relays of each cord were tested. Another arrangement consisted in connecting a test set to the three terminals of a cord by means of a separate spring clip for each terminal. Considerable expense was involved in the first instance because of the extra equipment required and the time-consuming operations necessary to perform the tests. In the second instance, the limited space between the bank of terminals made it difficult not only to attach the clips to the terminals but also, after their attachment, to keep them so positioned that they would not interfere with companion clips or adjacent terminals. Accordingly, it is an object of the present invention to provide a simple and inexpensive test connecter for associating testing apparatus with cord terminals to determine the condition of the relays included in the cord circuits in an expeditious and efficient manner.

Figure 1:
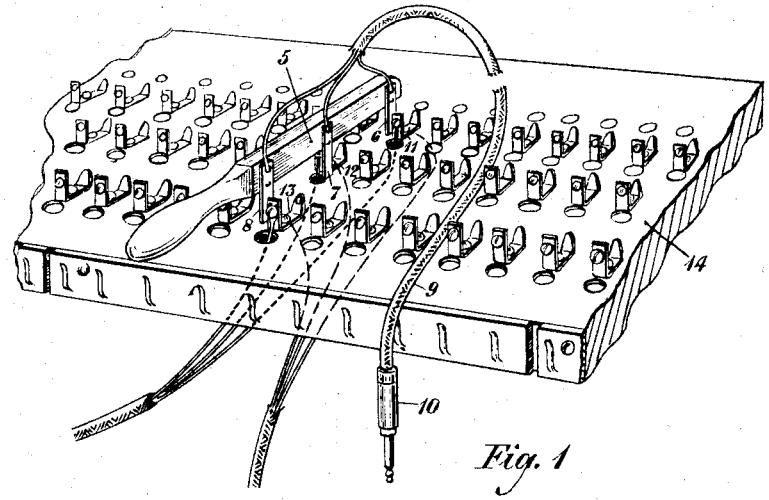
Figure 2:
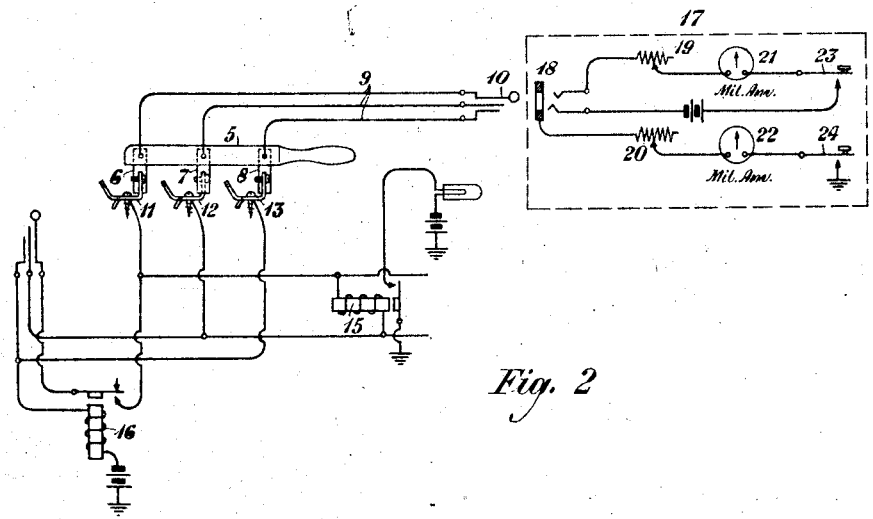

In the accompanying drawing, in which one embodiment of the improved arrangement is illustrated, Figure 1 is a perspective view of the test connecter in position applied to a group of terminals mounted on a shelf of a switchboard, and Fig. 2 is a diagrammatic representation of one end of a cord circuit with the test connecter applied to the tip, ring and sleeve terminals thereof and also a test set with which a plug of the test connecter may be associated.

Referring to the drawing, 5 represents a handle member of the test connecter on which spring contact members 6, 7 and 8 are mounted. The handle may be composed of any suitable material, such as wood, phenol fabric, or the like, and the spring members 6, 7 and 8 are suitably spaced thereon and positioned in the same plane with respect to each other. The springs are shown in the present instance as being attached to the side of the handle in a specific manner, but they may be positioned in countersunk portions in said handle or attached thereto in any desired manner. A cord 9 terminating at one end in a plug 10 has three conductors which are connected to the tip, ring and sleeve contacts respectively of the plug, the other ends of said conductors being connected to the tip, ring and sleeve spring members 6, 7 and 8, respectively, of the test connecter 5. The three conductors are indicated as being connected to the contacts exteriorly of the handle for the purpose of clearness, but it will be obvious that in practice said wires may be suitably positioned within said handle.

The spring members 6, 7 and 8 are adapted to be attached to and held in engagement with any individual group of a bank of terminals, such as 11, 12 and 13, by the tension exerted by said spring members, as shown in Fig. 1. The bank of terminals is mounted upon a shelf 14 in the rear of the switchboard and the terminals of each individual group are arranged in staggered formation with respect to each other. The tip, ring and sleeve conductors of an operator's cord extend upwardly through openings in the shelf 14, and are connected by means of clips to the tip, ring and sleeve terminals 11, 12 and 13, respectively.

In Fig. 2 is indicated one end of an operator's cord circuit comprising tip, ring and sleeve conductors which are connected to the terminals as previously described. A supervisory relay 15 is connected in bridged relation to the tip and ring conductors, and a sleeve relay 16 is connected to the sleeve conductor. The test connecter 5 connects the terminals with a test set 17 by the insertion of plug 10 in jack 18 of said set. While a test set is herein disclosed associated with the test connecter for the purpose of illustration, it will be understood that the test connecter may be associated with any well known testing apparatus. The test set includes adjustable resistances 19 and 20 and milliammeters 21 and 22. The resistance 19 and milliammeter 21 are adapted to be used in testing the supervisory relay 15 in the operator's cord circuit, and the resistances 20 and milliammeter 22 are used in testing the sleeve relay 16 in said cord circuit.

In the operation of the improved arrangement the test connecter 5 is applied to the tops of an individual group of the terminals and then pressed downwardly against the sides thereof. When the test connecter is in position the right sides of the spring members 6 and 8 engage the left sides of the terminals 11 and 13, respectively, while the left side of the spring member 7 engages the right side of the terminal 12. The application of the spring members to the sides of the staggered terminals thus causes a lateral tension to be exerted by the spring members 6, 7 and 8 against the sides of the terminals which serves to keep the test connecter in clamped position between the terminals.

The plug 10 is inserted in the jack 18 of the test set 17 and the adjustable resistances and milliammeters in said set are so adjusted as to simulate actual line conditions to which the relays in the cord circuit may be subjected in service. Thus, when the test connecter is applied to the terminals and the plug is associated with the test set 17, a circuit is closed through the winding of supervisory relay 15, which is bridged across the cord circuit, through the tip and ring terminals 11 and 12 and spring contacts 6 and 7 respectively, tip and ring contacts of the plug 10 and jack 18, through the variable resistance 19 and milliammeter 21, closed contact of key 23 to battery. The closing of this circuit causes the milliammeter 21 to indicate the condition of the supervisory relay 15 in a well understood manner.

The circuit by which sleeve relay 16 is tested extends from battery, winding of relay 16, sleeve terminal 13 and spring contact 8, sleeve contact of plug 10 and jack 18, resistance 20 through milliammeter 22 and closed contact of key 24, to ground. The closing of this circuit causes the milliammeter 22 to record the condition of the sleeve relay 16 and adjustment thereof may be made as required.

While the arrangements of the invention have been illustrated as embodied in certain specific forms, which have been deemed desirable, it will be understood that they are capable of embodiment in many and widely varied forms without departing from the spirit of the invention as defined in the following claims.

What is claimed is:

1. A telephone switchboard having a shelf, a bank of terminals on said shelf, individual groups of said terminals arranged in staggered relation and being connected to switchboard apparatus to be tested, a test set, a test connecter associated with said test set by conductors, said test connecter having resilient members positioned in the same plane thereon so that they may be placed in simultaneous engagement with a plurality of terminals of a group to establish a connection between said test set and said switchboard apparatus to be tested.

2. A telephone switchboard having a shelf, a bank of terminals on said shelf, individual groups of said terminals arranged in spaced and staggered relation and being connected to switchboard apparatus to be tested, a test set, a test connecter associated with said test set by conductors, and spring contacts arranged in spaced relation on said test connecter and so positioned that they are held in clamped engagement between the staggered terminals of a group to establish a connection between said test set and said switchboard apparatus to be tested.

3. A telephone switchboard having a shelf, a bank of terminals on said shelf, individual groups of said terminals, each group comprising tip, ring and sleeve terminals arranged in spaced relation and being connected to switchboard apparatus to be tested, a test set, a test connecter associated with said test set by conductors, and spring contacts affixed to said test connecter in spaced position to correspond to the spaced terminals so that they may be placed in simultaneous engagement with a plurality of terminals of a group to establish a connection between said test set and said switchboard apparatus to be tested.

4. A telephone switchboard having a shelf, a bank of terminals on said shelf, individual groups comprising tip, ring and sleeve terminals arranged in spaced and staggered relation and being connected to switchboard apparatus to be tested, a test set, a test connecter associated with said test set by conductors, and spring contacts affixed to said test connecter in spaced relation to correspond to the spacing of said tip, ring and sleeve terminals so that said contacts may be clamped in simultaneous engagement with the staggered terminals of a group to establish a connection between said test set and said switchboard apparatus to be tested.

5. A telephone switchboard having a shelf, a bank of terminals on said shelf, individual groups of said terminals arranged in staggered relation and being connected to switchboard apparatus to be tested, a test set, a test connecter associated with said test set by conductors, and spring contacts arranged in spaced relation on said test connecter so that they may be placed in simultaneous engagement with a plurality of the terminals of a group to establish a connection between said test set and said switchboard apparatus to be tested, said spring contacts being held in clamped position between said terminals by the lateral tension exerted by the contacts against the sides of said terminals.

6. A telephone switchboard having a shelf, a bank of terminals on said shelf, individual groups of said terminals, each group comprising tip, ring and sleeve terminals arranged in staggered and spaced relation and being connected to switchboard apparatus to be tested, a test set, a test connecter associated with said test set by conductors, spring contacts arranged in spaced relation on said test connecter to correspond to the spaced terminals so that they may be placed in simultaneous engagement with a plurality of terminals of a group to establish a connection between said test set and said switchboard apparatus to be tested, said spring contacts being held in clamped position between said terminals by the lateral tension exerted by the contacts against the sides of the staggered terminals.

In testimony whereof, I have signed my name to this specification this 20th day of March 1925.

JOHN C. FRANFIELD.